Patented Feb. 6, 1923.

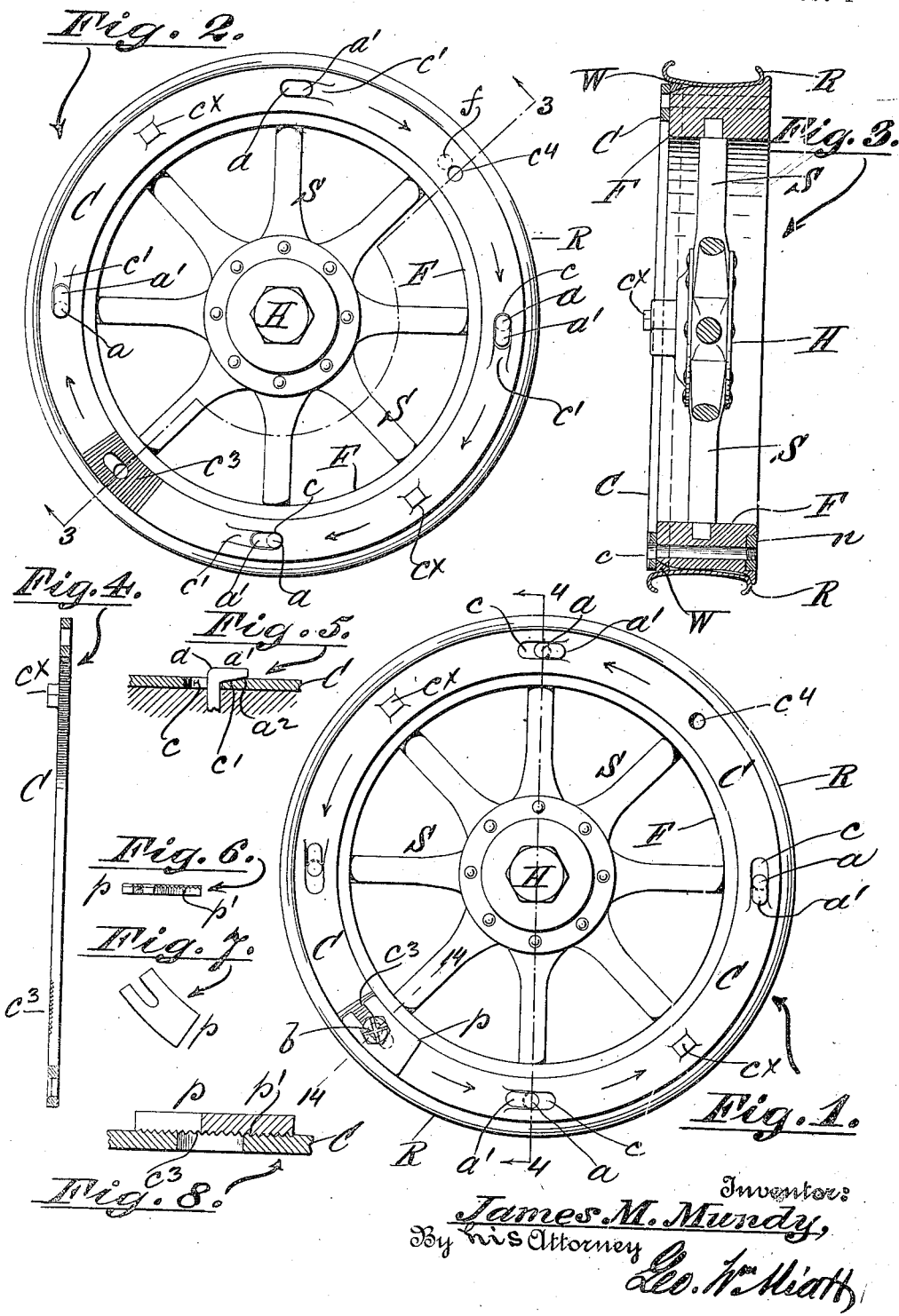

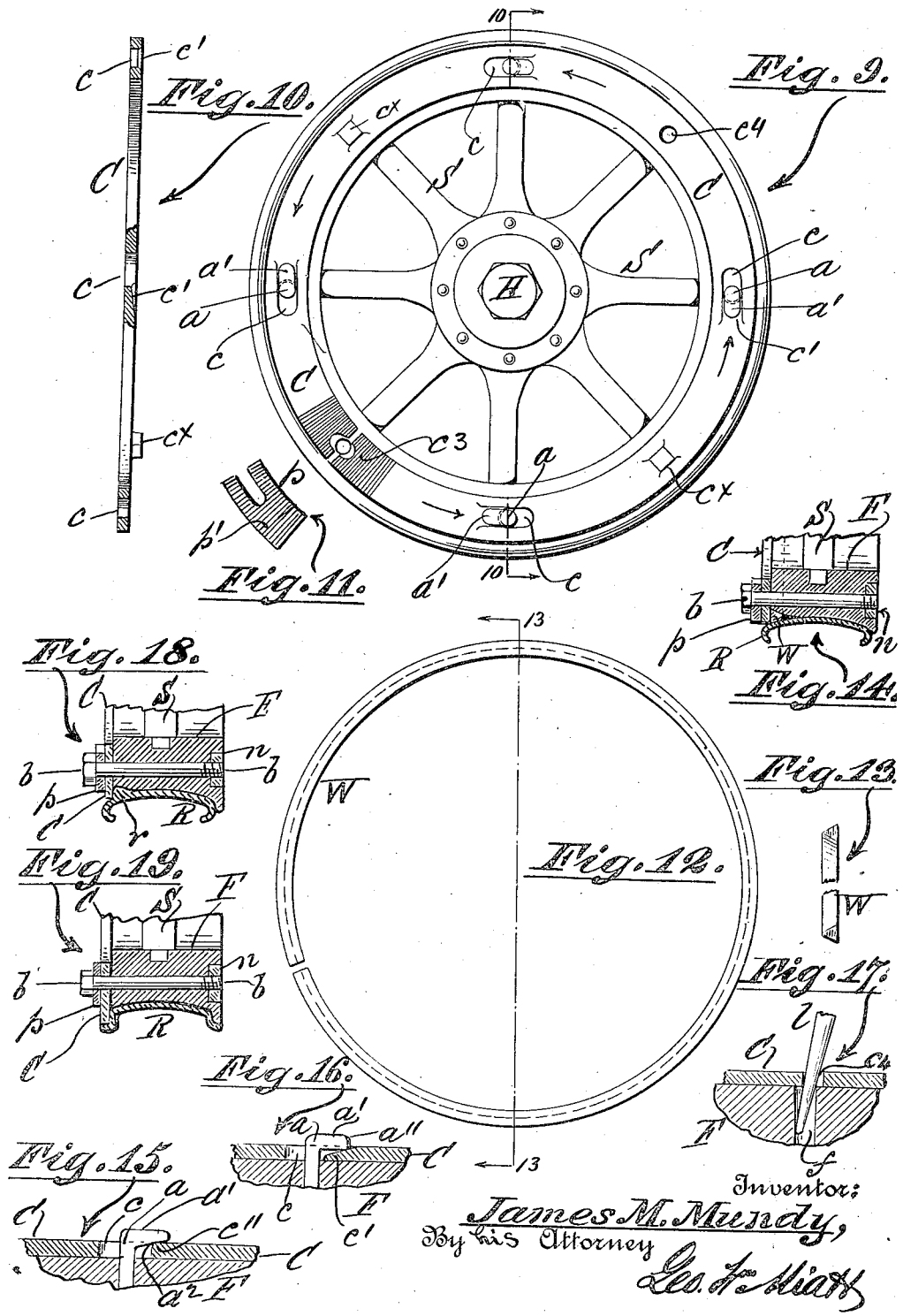

1,444,635

UNITED STATES PATENT OFFICE.

JAMES M. MUNDY, OF BROOKLYN, NEW YORK.

MEANS FOR SECURING TIRE RIMS TO VEHICLE WHEELS.

Application filed February 27, 1920. Serial No. 361,905.

*To all whom it may concern:*

Be it known that I, JAMES M. MUNDY, a citizen of the United States, and a resident of the borough of Brooklyn, county of Kings, city and State of New York, have invented certain new and useful Improvements in Means for Securing Tire Rims to Vehicle Wheels, of which the following is a specification.

My invention relates to vehicle wheels of the type in which a demountable rim is used for the support of the tire in a manner well known in the art, especially as related to automobiles,—the object being the provision of simple but effective means whereby the rim may be quickly and conveniently released or secured in position on the felloe of the wheel,—the invention consisting in the specific construction and arrangement of parts described and claimed, and distinctive features thereof consisting in the use of an annular clamping plate positioned on the side of the felloe for securing the tire rim to the felloe of the wheel,—said clamping plate being formed for contactual wedge-plane engagement with a plurality of attachment lugs protuberant from the side of the felloe; and also in the use, in conjunction therewith, of corrugated locking means, all as hereinafter fully set forth.

In the accompanying drawings,

Fig. 1, is a front side elevation of a wheel embodying the essential features of my invention, the parts being shown in locked relationship;

Fig. 2, is a view like unto Fig. 1, the lock and bolt having been removed, and the annular clamping plate retracted and in position for removal from the felloe of the wheel;

Fig. 3, is a section taken upon plane of line 3—3, Fig. 2;

Fig. 4, is a section of the annular clamping plate taken upon plane of line 4—4, Fig. 1;

Fig. 5, is a sectional detail of a portion of the clamping plate, showing one of the wedge planes, and its contactual engagement with one of the attachment lugs;

Figs. 6 and 7, are detail views of the lock plate;

Fig. 8, is an enlarged sectional detail of the corrugated locking means;

Fig. 9, is a front side elevation of the wheel illustrating the use of a split annular clamping plate;

Fig. 10, is a sectional view of said annular clamping plate, taken upon plane of line 10—10, Fig. 9, and partly broken away medially to show one of the wedge planes;

Fig. 11, is a view of the inner side of the lock plate;

Fig. 12, is an outer side elevation of the rim wedge ring;

Fig. 13, is a section thereof broken away centrally and taken upon plane of line 13—13, Fig. 12;

Fig. 14, is a sectional detail taken upon plane of line 14—14, Fig. 1;

Figs. 15 and 16, are sectional details like Fig. 5, showing modifications in the positioning of the wedge planes;

Fig. 17, is a sectional detail illustrating an auxiliary means of tightening the annular clamping plate on the felloe;

Figs. 18 and 19, are sectional details, like unto Fig. 14, showing my annular clamping plate as used in connection with different forms of demountable tire rims.

The main, central portion of the wheel may be of any desired or known construction, that shown in Figs. 1, 2 and 10, consisting of the hub H, spokes S, S, and felloe F, of an automobile wheel of well known parts. R, is the demountable rim of the clincher type, for the reception and support of the basic flanges of the shoe or tread of a pneumatic or other rubber tire in a manner so well known in the art that the representation of the tire is omitted in the drawings. W, is a wedge ring, of ordinary construction, used to tighten and hold the rim R, in position upon the periphery of the felloe F, as shown more particularly in Figs. 3 and 14.

In some forms of detachable tire rims this wedge ring W, is dispensed with as a separate part, the rim itself being formed with a wedge portion r, as in Fig. 18, against which wedge portion r, my annular clamping plate C, is made to bear, as in said illustration; or again in some cases the wedge is dispensed with entirely, as in Fig. 18, in which case my annular clamping plate C, bears against the outer or face flange of the rim R,—so that I do not limit myself to the use of the wedge ring W, the essential features in this respect being the utilization of my special construction of annular clamping plate and attachment lugs, with wedge plane contactual engagement therebetween, as a means of detachably securing the tire rim to the wheel felloe substantially as herein set forth.

The annular clamping plate C, fits against the front side of the felloe, and against the base or wide side of the wedge ring W, when used, the V-side of the wedge W, being inserted between the periphery of the felloe and the demountable rim R, as in the aforesaid Figs. 3 and 14. The clamping plate C, is supported upon the felloe by a plurality of what may be conveniently designated as attachment lugs a, a, protuberant from the side of the felloe F, and each formed with a shoulder a', adapted to overlap the outer face of said clamping plate C, which latter is formed with elongated concentric slots c, c, for the accommodation of said attachment lugs a, a. In the drawings the wheel is shown as formed with four of these attachment lugs a, a, although I do not limit myself in this respect, since three, five, or any desired number may be provided, according to preference or requirements.

The contactual surfaces $a^2$, of the shoulders a', of the attachment lugs a, a, and the corresponding contactual surfaces c', of the annular clamping plate C, may both be correspondingly inclined with relation to each other, as shown in Fig. 5, so as to attain mutually a close, wedge-like engagement,—or either one or the other of the interlocking contactual surfaces named ($a^2$, c') may be inclined to function as wedges, as illustrated in Figs. 15 and 16,—the essential feaure in this respect being an inclined wedgeable contactual engagement between the annular clamping plate C, and the attachment lugs a, a, which will insure the pressing of said clamping plate C, tightly against the outer side face of the felloe F, when the plate C, is forcefully turned in the direction of the arrows, Figs. 1 and 10, thereby driving the wedge ring W, in between the felloe F, and the tire rim R, as in Figs. 3 and 14, or pressing against the rim R, as in Figs. 17 and 18, and securing the latter firmly in operative position on the wheel. Thus in Fig. 15, the inclined surface $a^2$, on the attachment lug a, performs the function of a wedge when the opposed edge c'', of the slot c, is driven against it, while, conversely, in Fig. 16, the inclined surface c', of the clamping plate C, acts as a wedge when driven against the end a'', of the shoulder a', of the attachment lug a,—the result being the same in all three constructions shown in Figs. 5, 15 and 16, respectively, in that the plural wedging operation involved in the forceful turning of the annular clamping plate C, in the direction of the arrows Figs. 1 and 10, insures the driving home of the wedge ring W, to its prescribed position between the demountable rim R, and the periphery of the felloe as hereinbefore stated, or the forcing of the rim R, upon the periphery of the felloe as in Figs. 17 and 18, as the case may be.

To facilitate the wedging operation above set forth the annular clamping plate C, is formed on its outer face with two or more thrust shoulders $c^x$, $c^x$, which may be utilized in partially and forcefully rotating the said annular clamping plate C, in either direction, as in the direction of the arrows Figs. 1 and 10, for tightening purposes, or in the opposite direction as indicated by the arrows in Fig. 2, for the purpose of loosening said clamping plate C, from the felloe, as may be required.

Other and auxiliary means may also be provided for tightening or loosening the annular clamping plate C, as related to the felloe F. Thus the clamping plate C, may be formed with a pry hole $c^4$, for use in conjunction with a fulcrum hole f, in the side of the felloe F, the pointed end of a suitable lever or implement l, being inserted through the clamping plate pry hole $c^4$, and into the fulcrum hole f, in the felloe as illustrated in Fig. 17, and the lever l, being used to pry the clamping plate C, home against the attachment lugs a, a, or to loosen it therefrom, as required.

To effectually and positively lock the annular clamping plate C, in wedged position upon the felloe, I form said clamping plate C, with a series of transverse corrugations $c^3$, for engagement with a lock plate p, the inner side of which is formed with transverse corrugations p', corresponding with said corrugations $c^3$, on the clamping plate and adapted to coact therewith in securing the annular clamping plate C, against slip or retractile movement when wedged to the felloe as above set forth,—the lock plate p, being secured rigidly in position by means of a screw bolt b, passing through it, and through the clamping plate C, and felloe F, and engaging with a nut n, countersunk in the rear face of the felloe, as shown more particularly in Figs. 14, 17 and 18, of the drawings.

The annular clamping plate C, may be continuous throughout its circumference, as shown in Figs. 1 and 2, or it may be split as in Fig. 10, in which latter case the corrugations $c^3$, are formed on either side of the split,—the lock plate p, when in position, overlaps the opposed ends of the clamping plate C, so as to secure each end and half of said clamping plate C, against retractile movement when locked in position upon the felloe.

I have herein shown the rim wedge means W, for insertion between the felloe F, and the detachable rim R, as of annular form, and in one piece, although obviously it may be made in two or more sections without departing from the spirit and intent of my invention in this respect. Furthermore, while my annular clamping plate C, is preferably formed in one continuous piece, it also might be formed in sections, if preferred under certain conditions of use, so that I do not limit myself to the identical form of parts shown.

When formed in a single piece my annular clamping plate C, thus constructed and arranged in conjunction with the attachment lugs a, a, affords many practical advantages over the prior state of the art. Thus, by the removal of a single bolt b, and the forceful tapping of one or more of the thrust shoulders $c^x$, the clamping plate C, may be quickly and conveniently loosened up for removal to admit of the substitution of a new rim and tire, and as quickly replaced and firmly secured in position,—the single bolt b, being the only removable and replaceable securing means other than the annular clamping plate itself, and the latter, by its wedge-plane contactual engagement with the plurality of attachment lugs a, a, enables me to dispense with the plurality of bolts heretofore requisite to secure the tire rim to the felloe of the wheel. Hence the time and labor involved in replacement of tires is materially lessened by my invention as compared with the methods and means heretofore in vogue where a plurality of screw bolts has been deemed essential for the purpose.

From the foregoing it will be seen that a distinctive and essential feature of my invention is the annular clamping plate C, fitted to the face side of the felloe and formed with a plurality of elongated concentric slots c, in conjunction with the attachment lugs a, protuberant from the side face of the felloe,—the contactual engagement between said attachment lugs a, and the said coupling plate C, being wedgeable, as and for the purpose set forth. An auxiliary feature is the locking means provided for positively securing the wedged co-relation of annular side clamping plate and felloe by the use of a single bolt, the loosening of which admits of the uncoupling of the wedge-engaged parts by a slight partial rotation of the clamping plate C, which may be instantly effected by a hammer tap applied to one of the thrust shoulders $c^x$, or by equivalent means, after the loosening of a single bolt.

This function of practically instantaneous release is of import in any emergency, but especially so in connection with fire apparatus, and other emergency vehicles, where delay in the substitution of a wheel tire might result disastrously.

What I claim as my invention and desire to secure by Letters Patent is,

1. In combination with a wheel of the character designated, a demountable tire rim, rim wedge means positioned between said tire rim and the periphery of the felloe, an annular clamping plate fitted to the side of the felloe and formed with a transversely corrugated portion and also with a plurality of elongated concentric slots, shouldered attachment lugs protuberant from the side of the felloe, and fitting the said elongated concentric slots in the annular clamping side plate, the contactual surface engagement between said shouldered attachment lugs and the outer face of said annular clamping side plate being wedgeable, a transversely corrugated locking plate engageable with the aforesaid corrugated portion of the annular clamping plate, and means extended into the felloe, through the annular clamping side plate, and through the locking plate for positively securing said locking plate in position, for the purpose described.

2. In combination with a wheel of the character designated, a demountable tire rim, rim wedge means positioned between said tire rim and the periphery of the felloe, a split annular clamping plate fitted to the side of the felloe the end portions of which plate are formed with transverse corrugations, said split annular clamping side plate being also formed with a plurality of elongated concentric slots, shouldered attachment lugs protuberant from the side of the felloe and fitting the said elongated concentric slots in the annular clamping side plate, the contactual surface engagement between said shouldered attachment lugs and the outer face of the said annular clamping side plate being wedgeable, a transversely corrugated locking plate engageable with the aforesaid corrugated end portions of the split annular clamping side plate, and a securing bolt extending into the felloe, through the annular clamping side plate, and through the said locking plate, for the purpose described.

JAMES M. MUNDY.

Witnesses:
  GEO. WM. MIATT,
  DOROTHY MIATT.